United States Patent Office 3,126,384
Patented Mar. 24, 1964

3,126,384
4-QUINOLYL-AMINOALKYLAMINO DERIVATIVES
Paul Gailliot, Paris, and Jean Gaston Baget, Sceaux, France, assignors to Rhone-Poulenc S.A., Paris, France, a corporation of France
No Drawing. Filed May 23, 1962, Ser. No. 196,925
Claims priority, application France May 26, 1961
10 Claims. (Cl. 260—268)

This invention relates to new quinoline derivatives, to processes for their preparation and pharmaceutical compositions containing them.

According to the present invention, there are provided new 4-aminoquinoline derivatives of the general formula:

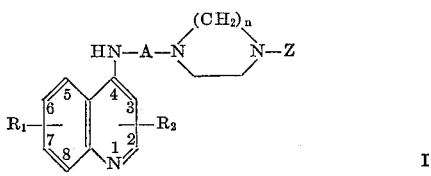

I (wherein A represents a divalent, straight or branched chain aliphatic hydrocarbon group containing 2 to 6 carbon atoms, Z represents an aromatic heterocyclic group linked to the diazacycloalkane ring through a carbon atom, the hetero-atoms of which consist of one or two nitrogen atoms, unsubstituted or substituted by one or more substituents selected from the group consisting of halogen atoms, and alkyl, alkoxy, alkylthio, alkanesulphonyl, dialkylsulphamoyl, amino, alkanoylamino, nitro, cyano, trifluoromethyl, phenyl, phenylamino, and phenyl and phenylamino substituted in the phenyl group by one or more halogen atoms or alkyl groups, $R_1$ represents a hydrogen or halogen atom, or an alkyl, alkoxy, alkylthio, alkanesulphonyl, dialkylsulphamoyl, amino, alkanoylamino, nitro, cyano or trifluoromethyl group in the 5,6,7 or 8-position of the quinoline ring, $R_2$ represents a hydrogen or halogen atom, or an alkyl or phenyl group or a phenyl group substituted by a halogen atom or an alkyl group, in the 2- or 3-position of quinoline ring, $n$ represents 2 or 3, and the diazacycloalkane ring

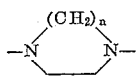

may carry one or more alkyl groups containing at most four carbon atoms, or phenyl groups) and their acid addition salts. In this specification and accompanying claims the alkyl, alkoxy, alkane and alkanoyl groups referred to contain at most 3 carbon atoms unless otherwise stated. The aromatic heterocyclic group Z may be, for example, a quinolyl, pyridyl, pyrimidyl or acridyl group unsubstituted or substituted as aforementioned. Preferably the group Z is a 4-quinolyl group of the general formula:

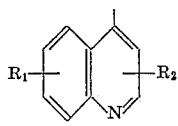

II wherein $R_1$ and $R_2$ are as hereinbefore defined.

When the hydrocarbon group A of the aforesaid 4-aminoquinoline derivatives contains an asymmetric carbon atom, the compounds can exist in three stereoisomeric forms: two optically active forms and a racemic form. The present invention includes all stereoisomeric forms of compounds of general Formula I and also acid addition salts of all such compounds.

According to a feature of the present invention, the 4-aminoquinoline derivatives of general Formula I are prepared by the process which comprises reacting a heterocyclic compound of the general formula:

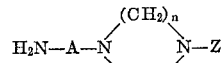

III with a quinoline compound of the general formula:

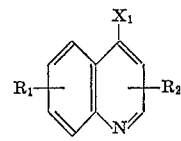

IV wherein $X_1$ represents a chlorine atom or a phenoxy radical, and A, Z, $R_1$, $R_2$ and the group

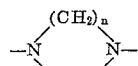

are as hereinbefore defined. The reaction may be effected with or without an inert organic solvent medium in the presence or absence of a condensing agent. Preferably it is carried out by heating the reactants in an inert organic solvent having a high boiling point, such as phenol, at a temperature between 150° and 250° C.

According to a further feature of the invention, the 4-aminoquinoline derivatives of general Formula I are prepared by the process which comprises reacting a heterocyclic compound of the formula $X_2$—Z (wherein $X_2$ represents a halogen atom, a phenoxy radical, or the acid residue of a reactive sulphuric ester or sulphonic ester, such as methanesulphonyloxy, benzenesulphonyloxy, or toluene-p-sulphonyloxy group, and Z is as hereinbefore defined) with a compound of the general formula:

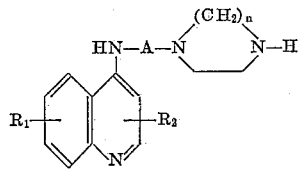

V in which A, $R_1$, $R_2$ and the group

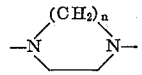

are as hereinbefore defined.

When $X_2$ represents a halogen atom or the acid residue of a reactive sulphuric or sulphonic ester, the reaction is advantageously effected in an inert aromatic hydrocarbon or ketone solvent medium in the presence of an acid-binding agent, preferably an alkali metal derivative or a tertiary amine. The reaction is conveniently carried out at the boiling temperature of the solvent employed.

When $X_2$ represents a phenoxy radical, the reaction is preferably effected in an inert organic solvent, such as an aromatic hydrocarbon (for example, xylene) or an amide (for example, dimethylformamide), and advantageously at a temperature between 120° and 200° C.

The starting materials of Formula V may be prepared by reacting a quinoline compound of Formula IV with a 1-aminoalkyl-4-alkyloxycarbonylpiperazine, and then removing in manner known per se the alkyloxycarbonyl group from the resultant product.

In the case of those 4-aminoquinoline derivatives of general Formula I wherein the heterocyclic group Z is identical with the quinoline radical, i.e. compounds of the formula:

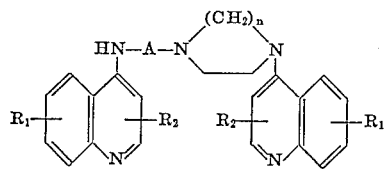
VI in which the two symbols $R_1$ represent identical atoms or groups and the two symbols $R_2$ represent identical atoms or groups, such derivatives can be obtained in a single step instead of two steps, involving the prior preparation of starting materials of Formula V, by reacting at least two molecules of the quinoline compound of Formula IV with a heterocyclic compound of the general formula:

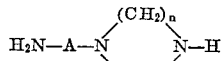
VII in which A and the group

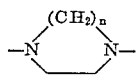

are as hereinbefore defined.

According to a still further feature of the invention, 4-aminoquinoline derivatives of general Formula I are prepared by the process which comprises reacting a heterocyclic compound of the general formula:

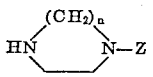
VIII (wherein Z and the group

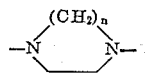

are as hereinbefore defined) with a quinoline derivative of the general formula:

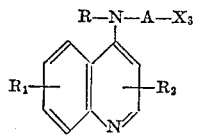
IX wherein R represents a hydrogen atom or an alkanoyl group containing up to four carbon atoms, or a benzyl group, $X_3$ represents a chlorine atom, or the acid residue of a reactive sulphuric or sulphonic ester such as methanesulphonyloxy, benzene sulphonyloxy or toluene-p-sulphonyloxy group, and the other symbols are as hereinbefore defined, and, when R is an alkanoyl or benzyl group, deacylating or debenzylating the resultant product by methods known per se. The reaction is preferably effected in an inert organic solvent, for example an alcohol, an aromatic hydrocarbon or a ketone, in the presence of an acid-binding agent, for example, a tertiary amine, and is advantageously carried out at the boiling temperature of the solvent employed.

The 4-aminoquinoline derivative of general Formula I are also prepared, according to another feature of the invention, by reduction of the carbonyl group of a quinoline derivative of the general formula:

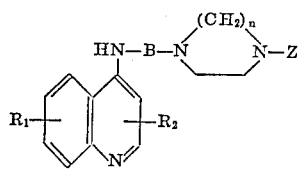
X (wherein B represents a divalent grouping —CO—$A_1$— or —$A_1$—CO— in which $A_1$ is an aliphatic hydrocarbon radical containing up to 5 carbon atoms and is such that the group —$CH_2$—$A_1$— or —$A_1$—$CH_2$— is identical to the hydrocarbon group A, A and the other symbols and group

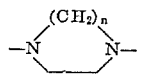

being as hereinbefore defined) to the methylene group, i.e. —$CH_2$—, by methods known per se for effecting such a reduction. The reduction is preferably effected with lithiumaluminium hydride at ambient temperature or with slight heating, for example at between 20° and 40° C., in the presence or absence of an inert organic solvent for the quinoline derivative such as an aromatic hydrocarbon (for example, xylene), a substituted amide (for example, dimethylformamide) or an ether (for example, tetrahydrofuran).

The starting materials of Formula X may be prepared by the application of known methods. Thus, for example, those compounds in which B represents the grouping —CO—$A_1$— may be obtained by reacting an acid chloride of the formula:

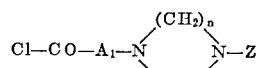
XI with a 4-aminoquinoline of the formula:

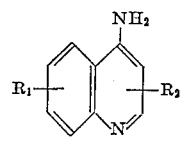
XII and those compounds where B represents a grouping —$A_1$—CO— by reacting a quinoline compound of the formula:

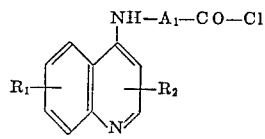
XIII with a compound of Formula VIII. In Formulae XI, XII and XIII the various symbols and the group

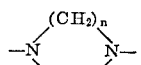

are as hereinbefore defined.

Products of Formula I obtained by the aforementioned processes may be converted by methods known per se into different products within the scope of the present invention, for example a compound of Formula I wherein $R_1$ represents an alkanoylamino group may be converted by deacylation into a corresponding compound where $R_1$ represents an amino group.

The new 4-aminoquinoline derivatives of Formula I may be converted by methods known per se into acid addition salts. Thus, the acid addition salts may be obtained by the action of an acid on the quinoline derivative in an appropriate solvent such as an alcohol, an ether, a ketone, or water. The acid addition salt which is formed is precipitated, if necessary after concentration of its solution, and is separated by filtration or decantation.

In this specification the term "methods known per se" means methods heretofore used or described in the chemical literature.

The new 4-aminoquinoline derivatives of the present invention and their non-toxic acid addition salts possess useful chemotherapeutic properties. They are, in particular, useful as antimalarials, anthelmintics and amoebicides. Preferred compounds are those of Formula I wherein the heterocyclic group Z is a 4-quinolyl group of Formula II, wherein $n$ represents 2, and especially such compounds wherein $R_1$ represents a chlorine atom. Compounds of particular importance are 1-(4-7'-chloro-4'-quinoylamino-1-pentyl)-4-(7-chloro-4-quinolyl)piperazine,
1-(4-7'-chloro-4'-quinolylamino-1-pentyl)-4-(6-chloro-4-quinolyl)piperazine and
1-(4-7'-chloro-4'-quiolylamino-1-pentyl)-4-(7-methoxy-4-quinolyl)piperazine (useful in their preventitive action as antimalarials); 1-(2-7'-chloro-4'-quinolylamino-1 - propyl) - (7 - chloro-4-quinolyl)piperazine in its racemic and optically active forms (useful in their curative action as antimalarials, and 1 - (3-7'-chloro-4'-quinolylamino - 1-propyl)-4-(7-chloro-4-quinolyl)-piperazine (useful as an amoebicide).

Other compounds of importance are 1-(2-7'-chloro-4'-quinolylamino-1-ethyl)-4-(7-chloro-4-quinolyl)-piperazine,
1-(4-6'-chloro-4'-quinolylamino-1-pentyl)-4-(7-chloro-4-quinolyl)piperazine,
1-(5-7'-chloro-4'-quinolylamino-1-pentyl)-4-(7-chloro-4-quinolyl)piperazine,
1-(4-7'-chloro-4'-quinolylamino-1-butyl)-4-(7-chloro-4-quinolyl)piperazine and
1-(2-7'-chloro-4'-quinolylamino-1-butyl)-4-(7-chloro-4-quinolyl)piperazine.

For therapeutic purposes, the bases of general Formula I are preferably employed as such or in the form of non-toxic acid addition salts, i.e. salts containing anions which are relatively innocuous to the animal organism in therapeutic doses of the salts (such as hydrochlorides and other hydrohalides, phosphates, nitrates, sulphates, acetates, propionates, succinates, benzoates, fumarates, maleates, theophylline - acetates, salicylates, phenolphthalinates, methylene-bis-$\beta$-hydroxynaphthoates (also known as embonates), resorcylates, gentisates and p-hydroxyisophthalates) so that the beneficial physiological properties inherent in the bases are not vitiated by side-effects ascribable to the anions.

The following examples illustrate the invention.

*Example I*

A mixture of 4-(5-1'-piperazinyl-2-pentyl)amino-7-chloroquinoline (133 g.), 4,7-dichloroquinoline (87 g.), crystalline phenol (720 g.) and ammonium chloride (2 g.) is heated with stirring at 180° C. for four hours and, after cooling, the reaction mixture is poured into a solution prepared from sodium hydroxide solution (d.=1.33; 1150 cc.) and distilled water (7 litres). The free organic base is extracted twice with chloroform (total 2 litres) and the chloroformic solution washed with water (1 litre) and then extracted with 3.5% hydrochloric acid (2 litres). The solution of the hydrochloride thus obtained is treated with decolourising charcoal (10 g.) and filtered. Sodium hydroxide solution (d.=1.33; 250 cc.) is added to this solution and the base which separates in the form of a yellow precipitate is filtered off, washed with distilled water and redissolved in a mixture of distilled water (2,500 cc.) and methanesulphonic acid (82 cc.). The solution obtained is treated with decolourising charcoal (10 g.) and filtered. Sodium hydroxide solution (d.=1.33; 150 cc.) is added to this solution and the precipitate obtained is filtered off, washed with distilled water (1750 cc.) and dried in vacuo, giving 1-(4-7'-chloro-4'-quinolylamino - 1 - pentyl) - 4 - (7 - chloro - 4 - quinolyl)piperazine (166 g.), M.P. about 125° C. This base is purified via its picrate. The picrate, prepared in ethanol and recrystallised from dimethylformamide, melts at 200° C., and the purified base liberated from the picrate melts at about 125° C.

*Example II*

A mixture of 4-(5-1'-piperazinyl-2-pentyl)amino-7-chloroquinoline (200 g.), 4,7-dichloroquinoline (119 g.) and phenol (113 g.) is heated for 24 hours at 125° C. The incompletely cooled reaction product is poured into distilled water (1300 cc.) containing sodium hydroxide (92 g.). Chloroform (1500 cc.) is added and, after stirring for 16 hours to obtain complete solubilisation of the base in the solvent, the aqueous layer is decanted and extracted again with chloroform (1100 cc.).

The combined chloroformic extracts are extracted with a solution prepared from methanesulphonic acid (188 g.) and distilled water (100 cc. and the chloroformic layer is decanted and washed three times with distilled water (total 450 cc.). Methylene chloride (1000 cc.) is added to the combined aqueous extracts and the mixture made alkaline to pH 10 with a solution of sodium hydroxide (92 g.) in distilled water (215 cc.). The organic layer is separated by decanting and the aqueous layer extracted again with methylene chloride (1500 cc.). The combined organic extracts, clarified by filtration with sodium sulphate (15 g.), are chromatographed through alumina (1050 g.) in a column 5 cm. in diameter and 63 cm. high. Elution is carried out with methylene chloride (2400 cc.), and evaporation of the solvent on a water-bath gives the crude base (330 g.). This crude base is dissolved in boiling ethyl acetate (225 cc.), and di-isopropyl ether (225 cc.) added to the boiling solution. On cooling, a viscous product separates which crystallises slowly in the refrigerator. After separating, washing with di-isopropyl ether (250 cc.) and drying in vacuo (20° C./0.2 mm. Hg) for 15 hours, a product (199 g.), M.P. 142–144° C., is obtained. This product is purified further by two successive recrystallisations, first from methyl ethyl ketone (800 cc.) and then from ethyl acetate (250 cc.). After separating, washing and drying in vacuo (50° C./0.2 mm. Hg) for 20 hours, 1-(4-7'-chloro-4'-qinolylamino - 1 - pentyl) - 4 - (7 - chloro - 4 - quinolyl)-piperazine (125 g.), M.P. 157–158° C., is obtained.

The 4-(5-1'-piperazinyl-2-pentyl)amino-7-chloroquinoline used as starting material was prepared by reacting piperazine with 4-5'-chloro-2'-pentyl-amino-7-chloroquinoline, itself obtained by the action of thionylchloride on 4-5'-hydroxy-2'-pentyl-amino-7-chloroquinoline, the latter compound being prepared by reacting 4-aminopentanol with 4,7-dichloroquinoline.

*Example III*

A mixture of 4-(2-1'-piperazinyl-1-ethyl)amino-7-chloroquinoline (72.7 g.), 4,7-dichloroquinoline (54.5 g.), phenol (450 g.) and ammonium chloride (1.25 g.) is heated with stirring for 4 hours at 180° C. The cooled reaction product is poured into distilled water (5,200 cc.) in which sodium hydroxide (340 g.) has been dissolved. The base which separates is extracted three times with chloroform (total 1500 cc.). The combined chloroformic extracts are washed with distilled water (2 litres) and then clarified by filtration with sodium sulphate. By evaporation of the chloroform in vacuo (50° C./20 mm. Hg), the crude base (173 g.) is obtained. This crude base is dissolved in methylene chloride (2 litres), filtered to separate a small quantity of insoluble material and chromatographed through alumina (1250 g.) in a column 5 cm. in diameter and 1 metre high. Elution is carried out with methylene chloride (1 litre) followed by methyl ethyl ketone (3 litres). The fraction eluted with methylene chloride is dried in vacuo and then recrystallised from methyl ethyl ketone (200 cc.). The crystals are separated, washed with methyl ethyl ketone (80 cc.) and dried in vacuo (45° C./0.2 mm. Hg) for 30 hours, giving a product (49 g.), M.P. 216–218° C. The fraction eluted with methyl ethyl ketone, concentrated to about 100 cc., crystallises. After separating, washing with methyl ethyl ketone (50 cc.) and drying as above, a product (16 g.), M.P. 215° C., is obtained.

The preceding two crops are combined and recrystallised from isoamyl acetate (3250 cc.). After separating, washing with absolute ethanol (150 cc.) and drying in vacuo (60° C./0.2 mm. Hg) for 13 hours, 1-(2-7'-chloro-4' - quinolylamino - 1 - ethyl) - 4 - (7 - chloro - 4 - quinolyl)piperazine (42.5 g.), M.P. 217–218° C., is obtained.

The 4-(2-1'-piperazinyl-1-ethyl)amino-7 - chloroquinoline used as starting material was prepared by reacting piperazine with 4-(2-chloro-1-ethyl)amino-7-chloroquinoline.

*Example IV*

Proceeding as in Example III but starting with 4-(3-1'-piperazinyl-1-propyl)amino-7-chloroquinoline (50 g.), 4,7-dichloroquinoline (35.6 g.), phenol (300 g.) and ammonium chloride (1 g.), two crops (weighing 26 g. and 10 g. respectively) are obtained. These two crops are combined, crystallised from acetonitrile and then from a mixture (90:10) of acetonitrile and absolute ethanol, separated, washed and dried for 48 hours at 40° C./0.2 mm. Hg, giving 1-(3-7'-chloro-4'-quinolylamino-1-propyl)-4-(7-chloro-4-quinolyl)piperazine (13 g.), M.P. 178–179° C.

The 4-(3-1'-piperazinyl-1-propyl)amino-7-chloroquinoline used as starting material was prepared by reacting piperazine with 4-3' - chloro - 1' - propyl-amino-7-chloroquinoline, itself obtained by the action of thionyl chloride on 4-3'-hydroxyl-1'-propyl-amino-7-chloroquinoline. The latter compound was prepared by the reaction of 3-aminopropanol with 4,7-dichloroquinoline.

*Example V*

A mixture of 4-(3-1'-piperazinyl-2-propyl)amino-7-chloroquinoline (30.5 g.), 4,7-dichloroquinoline (22 g.), phenol (193 g.) and ammonium chloride (0.5 g.) is heated with stirring for 4 hours at 175° C. The incompletely cooled reaction product is poured into distilled water (2000 cc.) in which sodium hydroxide (116 g.) has been dissolved. The base which precipitates is extracted with chloroform (500 cc.) and the chloroformic solution washed with distilled water and then treated with a solution prepared from pure methanesulphonic acid (20 cc.) and distilled water (500 cc.). The aqueous layer is decanted, cooled to about +5° C. and then made alkaline with a solution of sodium hydroxide (14 g.) in distilled water (35 cc.). The base which separates as a solid is washed with ice-water (500 cc.) and then dried at 20° C./0.2 mm. Hg for 20 hours, giving the crude base (40 g.). This crude base is dissolved in methylene chloride (670 cc.) and chromatographed through a column of alumina (500 g.) 3.6 cm. in diameter and 55 cm. high. Elution is carried out with methylene chloride (5 litres) followed by methyl ethyl ketone (3 litres). Evaporation of the elutes gives a product (33.8 g.) which is twice recrystallized from ethanol and then dried for 16 hours at 80° C./0.1 mm. Hg. giving 1-(2-7'-chloro-4'-quinolyl-amino-1-propyl)-4-(7-chloro-4-quinolyl)piperazine (16.5 g.), first M.P. about 140° C., second 194–195° C.

The 4-(3-1'-piperazinyl-2-propyl)amino-7-chloroquinoline starting material was obtained from 1-(2-7'-chloro-4'-quinolylamino-1-propyl)-4-ethoxycarbonyl - piperazine, itself obtained by the condensation of 4,7-dichloroquinoline with 1-2'-amino-1'-propyl-4-ethoxycarbonyl-piperazine. The latter compound was prepared from 1–2'-oximino-1'-propyl - 4 - ethoxycarbonyl - piperazine, itself obtained by the reaction of chloracetone oxime with ethoxycarbonyl-piperazine.

*Example VI*

A mixture of 4 - (3 - 1' - piperazinyl-2,2-dimethyl-1-propyl)amino-7-chloroquinoline (46.5 g.), 4-phenoxy-7-chloroquinoline (45.5 g.) and dimethylformamide (60 cc.) is heated for 5 hours at 140° C. The cooled reaction product is poured into distilled water (700 cc.) containing sodium hydroxide (16 g.) in solution. The base which separates is extracted with methylene chloride (500 cc.). The solution is extracted by stirring with a solution prepared from methanesulphonic acid (67 g.) and water (700 cc.). The aqueous solution obtained is made alkaline with a solution of sodium hydroxide (32 g.) in distilled water (75 cc.). The free base is extracted with methylene chloride (1 litre) and the organic extract clarified with sodium sulphate, filtered and the solvent driven off on a water-bath, finishing in vacuo (20° C./20 mm. Hg). The yellow residue obtained is crystallized from acetone (250 cc.) and, after separating and drying in vacuo (20° C./0.2 mm. Hg) for 16 hours, a product (32 g.), M.P. 222–223° C., is obtained.

The crude product is dissolved in boiling chloroform (100 cc.). Ethyl acetate (400 cc.) is then added and the solution left for 4 hours in a refrigerator. After separating, washing with ethyl acetate (50 cc.) and drying at 60° C./0.2 mm. Hg for 8 hours, 1-(3-7'-chloro-4'-quinolyl-amino-2,2-dimethyl-1-propyl)-4-(7 - chloro-4 - quinolyl(piperazine (28.5 g.), M.P. 224° C., is obtained.

The 4-(3-1'-piperazinyl - 2,2-dimethyl-1-propyl)amino-7-chloro-quinoline starting material was obtained from 1-(3-7'-chloro-4'-quinolyl-amino - 2,2 - dimethyl-1-propyl)-4-ethoxycarbonylpiperazine, itself obtained by the condensation of 4-phenoxy-7-chloroquinoline with 1–3'-amino-2',2' - dimethyl-1'-propyl-4-ethoxycarbonylpiperazine. The last-mentioned compound was prepared by reduction of 1-3'-oximino-2',2'-dimethyl-1'-propyl-4-ethoxycarbonylpiperazine, itself obtained by reaction of hydroxylamine with 1-2'-formyl-2'-methyl-1'-propyl-4-ethoxycarbonylpiperazine. The latter compound was prepared by carrying out a Mannich reaction with isobutyraldehyde, formaldehyde and ethoxycarbonylpiperazine.

*Example VII*

4-[5-methanesulphonyloxy - 2 - pentyl(acetyl)amino]-7-chloroquinoline (9.6 g.), 4-1'-piperazinyl-7-chloroquinoline (6.2 g.) and triethylamine (2.5 g.) in ethanol (100 cc.) are heated overnight under reflux. After evaporation of the alcohol, the oily residue is taken up in 2N sodium hydroxide solution (50 cc.), diethyl ether (100 cc.) and ethyl acetate (300 cc.). The organic extracts, washed and dried, are evaporated, giving an oily residue (12.5) (picrate M.P. 185–188° C.). This residue (7.8 g.) is taken up in a solution of phthalic anhydride (4.7 g.) in anhydrous pyridine (70 cc.) and heated under reflux overnight. After evaporating the pyridine, the oily residue obtained (15 g.) is stirred with a mixture of 2N hydrochloric acid (100 cc.) and benzene (175 cc.). The aqueous acid solution is made alkaline with sodium hydroxide solution (d.=1.33; 45 cc.). A gum precipitates which is washed with water and then dissolved in methylene chloride (150 cc.). After drying over sodium sulphate and evaporating, 1-[4 - 7' - chloro-4'-quinolyl(acetyl)amino-1-pentyl]-4-(7-chloro-4-quinolyl)piperazine (7 g.) is thus isolated as a glass. This product (6.5 g.) is heated under reflux for 19 hours with an alkaline solution consisting of potassium hydroxide (6.8 g.), ethanol (75 cc.) and water (10 cc.). The alcohol is then evaporated and the oily residue is stirred for 1 hour 30 minutes minutes with water (250 cc.). The compound slowly solidifies and finally it is separated, washed with water and dried, giving an amorphous product (4.6 g.) which is suspended in anhydrous benzene (200 cc.). The last traces of water are removed by azeotropic distillation and the benzene solution is then filtered and evaporated. The gummy residue (5 g) is dissolved in ethyl acetate (40 cc.). The crystallization, which developes slowly, is seeded and, after being left overnight in a refrigerator, 1-(4-7'-chloro-4'-quinolylamino-1 - pentyl)-4-(7-chloro-4-quinolyl)piperazine (1980 g.), M.P. 142° C., is separated.

The 4 - [5 - methanesulphonyloxy-2-pentyl(acetyl)amino]-7-chloroquinoline starting material is prepared by reacting methanesulphonyl chloride with 4-[5-hydroxy-2-pentyl(acetyl)amino]-7-chloro-quinoline in benzene at ordinary temperature and in the presence of triethylamine. The 4-[5-hydroxy-2-pentyl(acetyl)amino]-7-chloroquinoline, M.P. 107–108° C., is obtained by the action of the theoretical quantity of boiling ethanolic potassium hydroxide solution on 4-[5-acetoxy-2-pentyl(acetyl)amino]-7-chloroquinoline, itself prepared by the reaction of boiling acetic anhydride on 4-(5-hydroxy-2-pentyl)amino-7-chloroquinoline.

*Example VIII*

A mixture of 4-(5-1'-piperazinyl-2-pentyl)amino-7-chloroquinoline (20.8 g.), 4,6-dichloroquinoline (12.4 g.) and phenol (11.9 g.) is heated at about 130° C. for 24 with stirring. After partial cooling, sodium hydroxide solution (d.=1.33; 25 cc.) and water (100 cc.) is added at about 90° C. After stirring while heating, the mixture is allowed to cool overnight with stirring. After filtering, the solid obtained is ground in a mortar with N sodium hydroxide solution (100 cc.), filtered again and washed with water (350 cc.). The solid is dissolved in 2N methanesulphonic acid (100 cc.), decolourising charcoal added, and filtered. Sodium hydroxide solution (d.=1.33; 25 cc.) is added to the filtrate and the free base extracted with chloroform (300, 100 and 50 cc.). The chloroformic extracts are dried over sodium sulphate, filtered and concentrated under a pressure of 20 mm. Hg on a water-bath given a resin (26.5 g.) which is dissolved in benzene (530 cc.). After chromatography through a column of alumina (530 g.), elution successively with benzene, mixtures of benzene and ethyl acetate and ethyl acetate alone, and evaporation of these solvents, resins are obtained from which, by dissolution in ethanol containing 20% water, crystallization, separating and drying, white crystals (15.3 g.) of 1-(4-7'-chloro-4'-quinolylamino-1-pentyl)-4-(6-chloro-4-quinolyl)piperazine, M.P. about 110° C., are obtained.

*Example IX*

Proceeding as in Example VIII but starting with 4-(5-1' - piperazinyl-2-pentyl)amino-7-chloroquinoline (20.8 g.) and 4-chloro-7-methoxyquinoline (12.1 g.), bright yellow crystals (7.2 g.) of 1-(4-7'-chloro-4'-quinolylamino-1-pentyl)-4-(7 - methoxy - 4 - quinolyl)piperazine are obtained which, after recrystallisation from methyl ethyl ketone, melt at about 140° C. (monohydrate) and then at about 192° C. (anhydrous).

*Example X*

Proceeding as in Example VIII but starting with 4-(5-1'-piperazinyl-2-pentyl)amino-7-chloroquinoline (13.3 g.) and 4-chloro-7-dimethylsulphamolylquinoline (10.8 g.), pale yellow crystals (5 g.) of 1-(4-7'-chloro-4'-quinolylamino-1-pentyl)-4-(7-dimethylsulphamoyl - 4 - quinolyl)-piperazine, M.P. about 120° C., are obtained.

*Example XI*

Proceeding as in Example VIII but starting with 4-(5-1'-piperazinyl-2-pentyl)amino-7-chloroquinoline (13.3 g.) and 4-chloro-7-trifluoromethylquinoline (9.3 g.), pale yellow crystals (6.2 g.) of 1-(4-7'-chloro-4'quinolylamino-1-pentyl)-4-(7-trifluoromethyl-4-quinolyl)-piperazine, M.P. about 90–100° C., are obtained.

*Example XII*

Proceeding as in Example VIII but starting with 4-(5-1'-piperazinyl-2-pentyl)amino-7-chloroquinoline (33.3 g.) and 2-methyl-4,7-dichloroquinoline (21.2 g.), white crystals (6.8 g.) of 1-(4-7'-chloro-4'-quinolylamino-1-pentyl)-4-(3-methyl-7-chloro-4-quinolyl)piperazine, M.P. about 130° C. after recrystallisation from ethyl acetate, are obtained.

*Example XIII*

Proceeding as in Example VIII but starting with 4-(5-1' - piperazinyl-2-pentyl)amino-6-chloroquinoline (21.4 g.), 4,7-dichloroquinoiline (12.7 g.) and phenol (12.1 g.), white crystals (20 g.) containing benzene are obtained. These crystals are dissolved in N hydrochloric acid (120 cc.) and water (80 cc.), decolourising charcoal added and filtered. N Sodium hydroxide solution (125 cc.) is added, with stirring, to the hot-filtered solution. After cooling, filtering, and washing by stirring with boiling water 2 x 200 cc.), 1-(4-6'-chloro-4'-quinolylamino-1-pentyl)-4-(7-chloro-4-quinolyl)piperazine (13.7 g.), M.P. about 110° C., is obtained.

The 4-(5-1'-piperazinyl-2-pentyl)amino-6-chloroquinoline starting material is obtained in the following manner:

By heating a mixture of 4,6-dichloroquinoline (39.6 g.), 2-amino-pentan-5-ol (41.2 g.) and a crystal of potassium iodide for 6 hours at 140° C., 4-(5-hydroxy-2-pentyl)-amino-6-chloroquinoline (46 g.), M.P. 142° C., is obtained. By the treatment of this compound (45 g.) with thionyl chloride (48 g.), 4-(5-chloro-2- pentyl)amino-6-chloroquinoline (34.8 g.), M.P. 156° C., is isolated which, on heating under reflux for 7 hours with anhydrous piperazine (54 g.) and sodium iodide (18.8 g.) in methyl ethyl ketone (400 cc.), gives a resin (41 g.) which is recrystallised from acetonitrile (100 cc.). After filtration and drying, 4-(5-1'-piperazinyl-2-pentyl)amino-6-chloroquinoline (21.5 g.), M.P. about 90° C., is obtained.

*Example XIV*

A mixture of phenol (21 g.), 4,7-dichloroquinoline (11.1 g.) and 4-(4-1'-piperazinyl-2-butyl)amino-7-chloroquinoline (18 g.) is heated at 125° C. for 5 hours. The mass obtained is poured into a solution of sodium hydroxide (20 g.) in distilled water (200 cc.) and the free base extracted with methylene chloride (700 cc.). The organic extracts are dried over sodium sulphate and then treated with methane-sulphonic acid (18 g.) in distilled water (400 cc.) to eliminate nonbasic products. The aqueous solution is treated with a solution of sodium hydroxide (12 g.) in distilled water (25 cc.) and the precipitated crude base is extracted with methylene chloride (300 cc.). The organic extracts are dried over sodium sulphate and then chromatographed through a column 4 cm. in diameter and 60 cm. high containing alumina (400 g.). Elution is carried out with methylene chloride (1500 cc.), the solvent is driven off under reduced pressure (20 mm. Hg) and the solid obtained is recrystallised from acetonitrile (70 cc.), giving 1-(3-7'-chloro-4'-quinolylamino-1-butyl)-4-(7-chloro-4-quinolyl) - piperazine (17.1 g.), M.P. 172–173° C.

The 4-(4-1'-piperazinyl - 2 -butyl)amino-7-chloroquinoline starting material, M.P. 196–197° C., was obtained by the removal of the ethoxycarbonyl group from 1-(3-7' - chloro - 4'-quinolylamino-1-butyl)-4-ethoxycarbonylpiperazine (the picrate of which melts at 268–269° C.), itself prepared by reacting 4,7-dichloroquinoline with 1-(3 - amino - 1 - butyl)-4-ethoxycarbonylpiperazine (B.P. 134–135° C./0.5 mm. Hg). The latter compound was obtained by the hydrogenation in the presence of Raney nickel of 1-(3-oximino-1-butyl)-4-ethoxycarbonylpiperazine prepared by the reaction of hydroxylamine with 1-(3-oxo-1-butyl)-4-ethoxycarbonylpiperazine, M.P. 172° C., obtained by a Mannich reaction between N-ethoxycarbonylpiperazine and formaldehyde in acetone.

*Example XV*

A mixture of 4,7-dichloroquinoline (176 g.), phenol (167 g.) and 1-(1-methyl-2-amino-ethyl)piperazine (58 g.) is heated with stirring for 15 minutes at 160° C. After cooling to 100° C., dimethylformamide (50 cc.) is added and the reaction mass poured into a solution of sodium hydroxide (140 g.) in distilled water (2 litres). The base which precepitates is extracted with methylene chloride (2 litres) and the slution obtained treated with a solution of methanesulphonic acid (115 g.) in distilled water (2 litres). After acidifying to pH 5, decolourising charcoal (5 g.) is added and filtered. The filtrate is made alkaline with a solution of sodium hydroxide (60 g.) in distilled water (1.5 litres). The precipitated base is extracted again with methylene chloride (1.5 litres) and the solvent removed on a water-bath. The oily residue obtained is taken up in a solution of acetone (500 cc.) and distilled water (60 cc.) and the base crystallises. After separation and recrystallisation of the damp product from a solution of ethanol (500 cc.) and distilled water (60 cc), filtering, washing with the same solvent (50 cc.) and drying in vacuo (0.2 mm. Hg) for 16 hours at 20° C., 1-(2-7'-chloro-4'-quinolylamino-1-methyl-ethyl) - 4 - (7-chloroquinolyl)-piperazine monohydrate (118 g.), M.P. about 130° C., is obtained.

The 1-(1-methyl-2-amino-ethyl)piperazine starting material was prepared from 1-benzyl-4-(1-methyl-2-aminoethyl)piperazine, B.P. 132–135° C./0.05 mm Hg, itself prepared from 1 - benzyl - 4 - (1-cyano-ethyl)-piperazine, B.P. 155–159° C./0.5 mm Hg. The latter compound was obtained from N-benzylpiperazine, acetaldehyde, sodium cyanide and sodium metabisulphite.

Example XVI

Proceeding as in Example XV but starting with 1-(5-amino-1-pentyl)piperazine (32 g.), 4,7-dichloroquinoline (79.2 g.) and phenol (75.2 g.) and replacing the methylene chloride for the extraction of the base by chloroform, 1 - (5-7'-chloro-4'-quinolylamino-1-pentyl)-4-(7-chloro-4-quinolyl)piperazine, (43 g.), M.P. 168° C., after recrystallisation from ethanol, is obtained.

The 1-(5-amino-1-pentyl)piperazine starting material was obtained by the hydrolysis of 1-(5-phthalimido-1-pentyl)-4-ethoxycarbonylpiperazine, M.P. 196–198° C., itself obtained by the condensation of 1-phthalimido-5-bromopentane, M.P. 61–62° C., with N-ethoxycarbonylpiperazine hydrochloride.

Example XVII

A mixture of 4-(2-1'-piperazinyl-1-isobutyl-ethyl)amino-7-chloroquinoline (20 g.), 4,7-dichloroquinoline (10.9 g.) and phenol (10.35 g.) is heated with stirring for 24 hours at 125° C. After cooling to about 90° C., the reaction mass is poured into a solution of sodium hydroxide (20 g.) in distilled water (500 cc.). The free base is extracted with methylene chloride (450 cc.) and the solution obtained washed with distilled water (150 cc.). The organic layer is then dried over sodium sulphate and chromatographed over alumina (250 g.) in a column 2 cm. in diameter and 40 cm. high. Elution is carried out with methylene chloride (2.5 litres). Evaporation of the eluates gives a dry extract (23 g.) which is crystallised from acetonitrile (110 cc.). After separating, washing with acetonitrile (50 cc.) and drying in vacuo (0.2 mm. Hg) for 16 hours at 50° C., a product (19.5 g.) is obtained which is dissolved in a boiling mixture of acetonitrile (570 cc.) and methyl ethyl ketone (220 cc.). On cooling, the purified base crystallises and is separated after standing for 18 hours at laboratory temperature, washed with a mixture of acetonitrile (70 cc.) and methyl ethyl ketone (30 cc.) and dried in vacuo (0.2 mm. Hg) for 16 hours at 50° C., giving 1-(2-7'-chloro-4'-quinolylamino-2-isobutyl-ethyl)-4-(7-chloro-4-quinolyl)piperazine (13.5 g.), M.P. 153–154° C.

The 4-(2-1' - piperazinyl - 1 - isobutyl - ethyl)amino-7-chloroquinoline (21 g.), M.P. 178–180° C., starting material was prepared by condensing 4-(2-chloro-1-isobutyl-ethyl)amino-7-chloroquinoline (59.5 g.), M.P. 148–149° C., with anhydrous piperazine (86 g.), in the presence of dry sodium iodide (30 g.) in methyl ethyl ketone. The chlorinated comopund (82 g.) was prepared by the chlorination with thionyl chloride (82 g.), in chloroform, of 4-(2-hydroxy-1-isobutyl-ethyl)amino - 7 - chloroquinoline (100 g.) (M.P. 168–169° C.), itself obtained by condensing DL-leucinol (117.5 g.) with 4,7-dichloroquinoline (99 g.).

Example XVIII

Proceeding as in Example XVII but starting with 4-(3-1'-piperazinyl-2-methyl-1-propyl)amino - 7 - chloroquinoline (24 g.), 4,7-dichloroquinoline (14.9 g.) and phenol (29 g.) and replacing the methylene chloride for extraction of the base by a 1:1 mixture of methylene chloride and chloroform (500 cc.), eluting with chloroform (5 litres) and crystallising from trichlorethylene, there is obtained, after recrystallisation from methyl isobutyl ketone, -1(3-7'-chloro-4'-quinolylamino-2-methyl-1-propyl)-4-(7-chloro - 4 - quinolyl)piperazine (15 g.), M.P. 218–220° C.

The 4-(3-1'-piperazinyl - 2 - methyl-1-propyl)amino-7-chloroquinoline M.P. 159–160° C., starting material was prepared as follows:

Reduction of ethyl α-cyanopropionate by lithiumaluminum hydride in diethyl ether gives 2-hydroxymethylpropylamine, B.P. 182–184.5° C./760 mm. Hg. This product was condensed with 4,7-dichloroquinoline to give 4-(2-hydroxymethyl-1-propyl)amino - 7-chloroquinoline, M.P. 156–158° C., which was then chlorinated with thionyl chloride. The 4-(2-chloromethyl-1-propyl)amino-7-chloroquinoline, M.P. 141–143° C., obtained was condensed with anhydrous piperazine in the presence of sodium iodide.

Example XIX

A mixture of 4,7-dichloroquinoline (41.6 g.) and phenol (40 g.) is heated with stirring to 120° C. The reaction then takes the temperature to 160° C. After allowing to cool to about 100° C., 4-(4-1'-piperazinyl-1-butyl)amino-7-chloroquinoline (68.8 g.) is added and the mixture heated at 150° C. for 4 hours. After cooling to about 100° C., the reaction mass is poured into a solution of sodium hydroxide (80 g.) in distilled water (800 cc.). The crude base which precipitates solidifies and is separated, washed with distilled water (1500 cc.) and dried under reduced pressure (20 mm. Hg) for 24 hours at 60° C.

The product obtained above (65 g.) is dissolved in boiling trichloroethylene (2 litres) and the solution concentrated (to 500 cc.). The product crystallises and is separated, washed with trichloroethylene (200 cc.) and dried in vacuo (0.2 mm. Hg) for 20 hours at 55° C. The impure base (50 g.) thus obtained is dissolved in methylene chloride (1000 cc.) and the solution chromatographed through alumina (700 g.) in a column 5.7 cm. in diameter and 41 cm. high. After elution with methylene chloride (16 litres), the dry extract (24 g.) from the eluates, is recrystallised from methyl ethyl ketone (400 cc.). Drying in vacuo (0.2 mm. Hg) for 8 hours at 65° C. gives 1-(4-7'-chloro-4'-quinolylamino - 1 - butyl)-4-(7-chloro-4-quinolyl)piperazine (18 g.), M.P. 173–175° C.

The 4-(4-1'-piperazinyl-1-butyl)amino - 7-chloroquinoline starting material, M.P. 140–142° C. is obtained by a procedure analogous with that described in Example XIV for the preparation of 4-(4-1'-piperazinyl-2-butyl)-amino-7-chloroquinoline.

Example XX

A mixture of 4-(2-1'-piperazinyl-1-ethyl-ethyl)amino-7-chloroquinoline (60 g.), 4,7-dichloroquinoline (38 g.) and phenol (36 g.), is heated with stirring for 24 hours at 125° C. After allowing to cool to about 100 C., the reaction product is poured into a solution of sodium hydroxide (24 g.) and distilled water (500 cc.). The base which precipitates is separated, washed with distilled water (1000 cc.) followed by ethyl acetate (500 cc.), giving a non-dry base (43 g.) which is dissolved in methyl ethyl ketone (500 cc.). The solution obtained is chromatographed through alumina (500 g.) in a column 3.5 cm. in diameter and 45 cm. high. After elution with methyl ethyl ketone (2 litres) the extract obtained by evaporation of the elution solvent is dissolved in boiling acetonitrile (800 cc.). On cooling, a product crystallises which is separated after standing for 16 hours at laboratory temperature and washed with acetonitrile (20 cc.). Drying in vacuo (0.2 mm. Hg) for 20 hours at 50° C. gives 1-(2-

7'-chloro-4'-quinolylamino - 1 - butyl) - 4 - (7 - chloro-4-quinolyl)piperazine (13.5 g.), M.P. 177–178° C.

The 4-(2-1'-piperazinyl-1-ethyl - ethyl)amino-7-chloroquinoline starting material was obtained by a procedure analogous to that described in Example XVII for 4-(2-1'-piperazinyl-1-isobutyl-ethyl)-amino-7-chloroquinoline.

*Example XXI*

A mixture of D(—) 4-(3-1'-piperazinyl-2-propyl)amino-7-chloroquinoline (22.9 g.), 4,7-dichloroquinoline (16.35 g.) and phenol (15.5 g.) is heated progressively, with stirring, to 130° C. Reaction commences and the temperature rises to 185° C. without external heating. Heating at 185° C. is continued for 1 hour. The reaction mass, cooled to 160° C., is then poured into a solution of sodium hydroxide (12 g.) in distilled water (100 cc.). The base which precipitates is extracted with chloroform (220 cc.). The chloroformic solution is then extracted with a solution of pure methanesulphonic acid (30 g.) in distilled water (180 cc.) (in two portions) and the aqueous solution of the methanesulphonate obtained is clarified by the addition of decolourising charcoal (2 g.) and filtration. The base precipitates on the addition of sodium hydroxide solution (d.=1.33; 35 cc.) and is washed by decanting with distilled water (200 cc.). The damp base is taken up in a mixture of toluene (750 cc.) and ethanol (250 cc.) and dehydrated by distilling off the solvent (700 cc.) at ordinary pressure, drying being completed under reduced pressure (20 mm. Hg) at 50° C. The dehydrated base (49 g.) is dissolved in methylene chloride (300 cc.) and chromatographed through alumina (500 g.) in a column 3.6 cm. in diameter and 50 cm. high. Elution is then carried out with methylene chloride (3 litres) followed by methyl ethyl ketone (2 litres). The solvents are evaporated and the two extracts obtained (10.8 g. and 28 g. respectively) are taken up in methyl ethyl ketone (50 cc. and 100 cc.). After standing for 20 hours in a refrigerator, separating, washing with methyl ethyl ketone and drying, the two fractions obtained are combined (damp weight 12.3 g. and 17.5 g.) and recrystallised from boiling ethyl acetate (1100 cc.). On cooling, the purified base crystallises and is separated, washed with ethyl acetate (50 cc.) and dried in vacuo (0.1 mm. Hg) for 24 hours at 50° C., giving D(—) 1-(2 - 7' - chloro - 4' - quinolylamino - 1 - propyl) - 4 - (7 - chloro-4-quinolyl)piperazine (16.3 g.), M.P. 182–184° C., optical rotation $[\alpha]_D^{23}=-180\pm1°$ (c.: 2, ethanol).

The D(—) 4 - (3 - 1' - piperazinyl - 2 - propyl)amino-7-chloroquinoline (60.1 g.) [M.P. 131–132° C., $[\alpha]_D^{23}=-137\pm1°$ (c.: 2, ethanol)] employed as starting material was obtained by condensing D(—) 4-(3-chloro-2-propyl)amino-7-chloroquinoline (70 g.) [M.P. 146–147° C., $[\alpha]_D^{24}=-103.5\pm1°$ (c.: 2, ethanol)] with anhydrous piperazine (118.5 g.) in the presence of dry sodium iodide (41.25 g.) in methyl ethyl ketone (825 cc.).

The above-mentioned chlorinated compound (71.9 g.) was obtained by the chlorination of D(—) 4-(3-hydroxy-2-propyl)amino-7-chloroquinoline (78 g.) [M.P. 223–224° C., $[\alpha]_D^{25}=-29.4\pm2°$ (c.: 1.2, ethanol)] with thionyl chloride (72.5 g.) in chloroform (375 cc.).

The above-mentioned alcohol (80.8 g.) was prepared by condensing 4,7-dichloroquinoline (81.5 g.) with D(—) alaninol (61.9 g.), B.P 68–69° C./10 mm. Hg, $[\alpha]_D^{25}=-23\pm1°$ (c. 2, ethanol).

*Example XXII*

Proceeding under the same conditions as those of Example XXI but starting with L(+) 4-(3-1'-piperazinyl-2-propyl)amino-7-chloroquinoline (22.9 g.), 4,7-dichloroquinoline (16.35 g.) and phenol (15.5 g.), L(+) 1-(2-7'-chloro - 4' - quinolylamino - 1 - propyl) - 4 - (7 - chloro-4-quinolyl)piperazine (12.6 g.) [M.P. 181–182° C., optical rotation $[\alpha]_D^{23}=+177\pm1°$ (c.: 2, ethanol)] is obtained.

The L(+) 4 - (3 - 1' - piperazinyl - 2 - propyl)amino-7-chloroquinoline (32 g.) [M.P. 128–130° C., $[\alpha]_D^{24}=+140\pm2°$ (c.: 2, ethanol)] employed as starting material was obtained by condensing L(+) 4-(3-chloro-2-propyl)amino-7-chloroquinoline (48.4 g.) [M.P.=146–148° C., $[\alpha]_D^{22}=+100\pm1°$ (c.: 2, ethanol)] with anhydrous piperazine (78 g.) in the presence of sodium iodide (28.5 g.) in methyl ethyl ketone.

The chlorinated compound (42.3 g.) was prepared by the chlorination of L(+) 4-(3-hydroxy-2-propyl)amino-7-chloroquinoline (52 g.) [M.P. 224–226° C., $[\alpha]_D^{22}=+30\pm2°$ (c.=1, ethanol)] with thionyl chloride (52.3 g.) in chloroform.

The above-mentioned alcohol (48.1 g.) was prepared by the condensation of L(+) alaninol (43.2 g.) [B.P. 85–88° C./24 mm. Hg, $[\alpha]_D^{22}=+20.7\pm0.8°$ (c.=2.2, ethanol)] with 4,7-dichloroquinoline (57 g.).

*Example XXIII*

A mixture of L(+) 1-(2-7'-chloro-4'-quinolylamino-1-propyl)-4-(7-chloro-4-quinolyl)piperazine (1.0 g.), prepared as in Example XXII, D(—) 1-(2-7'-chloro-4'-quinolylamino - 1 - propyl) - 4 - (7 - chloro - 4 - quinolyl)piperazine (1.0 g.), prepared as in Example XXI, is dissolved by boiling in methyl ethyl ketone (40 cc.). On cooling, a product crystallises which is separated, washed with methyl ethyl ketone (5 cc.) and dried in vacuo (0.1 mm. Hg) for 20 hours at 50° C., giving DL 1-(2-7'-chloro - 4' - quinolylamino - 1 - propyl) - 4 - (7 - chloro-4-quinolyl)piperazine (1.43 g.), M.P. 194–195° C. This melting point is not depressed by mixture in equal parts with the product obtained in Example V. Like the last-mentioned product, it has no optical activity.

*Example XXIV*

A mixture of 4-(5-1'-piperazinyl-2-pentyl)amino-7-chloro-quinoline (20 g.), 4-chloropyridine (5.85 g.) and phenol (15 g.) is heated for 30 minutes with stirring at 130° C. The temperature is kept at 125° C. for 20 hours and, after cooling to 80° C., the pasty mass is poured into a mixture of chloroform (200 cc.), water (200 cc.) and 10 N sodium hydroxide solution (60 cc.). After stirring for one hour, the aqueous phase is decanted and extracted with chloroform (2 x 100 cc.). The chloroform extracts are combined and poured with stirring into a solution of pure methanesulphonic acid (30 g.) in water (1000 cc.). After stirring for 15 minutes and decanting, the chloroform layer is extracted with water (3 x 200 cc.).

The aqueous extracts are combined, stirred with decolourising charcoal (1. g.) for 15 minutes and filtered. Methylene chloride (400 cc.) is added to the filtrate which is then made alkaline to pH 13 with 10 N sodium hydroxide solution. The aqueous phase is decanted and extracted again with methylene chloride (2 x 150 cc.). The organic phases are combined, dried over sodium sulphate, filtered and the solvent removed on a water-bath, giving a crude product (19.86 g.) which is dissolved in methylene chloride (250 cc.). The solution is chromatographed through a column of alumina (200 g.). After elution with methylene chloride (1000 cc.) followed by methylene chloride containing 1% ethanol (1000 cc.), the solvents of the eluates are driven off and the residues (13.2 g.) recrystallised from isopropanol (250 cc.), giving 1-(4-7'-chloro-4'-quinolylamino-1-pentyl)-4-(4-pyridyl)piperazine (9.7 g.), M.P. 191–192° C.

*Example XXV*

Proceeding as in Example XXIV but starting with 4-(5-1'-piperazinyl-2-pentyl)amino-7-chloroquinoline (10 g.), 2-amino-4-ethyl-5-p-chlorophenyl-6-chloropyrimidine (8.04 g.) and phenol (15.4 g.), 1-(4-7'-chloro-4'-quinolyl-amino-1-pentyl) - 4 - (2-amino-4-ethyl-5-p-chlorophenyl-6-pyrimidyl)piperazine (8.6 g.), M.P. 114–117° C., is obtained.

The 2-amino-4-ethyl-5-p-chlorophenyl-6-chloropyrimidine starting material was prepared by a procedure analogous to that of F. Curd et al., J. Chem. Soc., p. 378 (1946).

*Example XXVI*

The procedure of Example XXIV is followed but starting with 4-(5-1'-piperazinyl - 2 - pentyl)amino-7-chloroquinoline (10 g.), 2-chloropyrimidine (3.44 g.) and phenol (20 g.), chromatographing a solution of the crude product in a benzene-methylene chloride mixture (4:1 by volume; 50 cc.) and eluting successively with a 1:1 benzene-methylene chloride mixture (450 cc.), a 1:4 benzene-methylene chloride mixture (400 cc.) and finally methylene chloride containing 1% ethanol (200 cc.). After evaporation of the solvents, a white product (9.28 g.), M.P. 141–143° C., is obtained which, on recrystallisation from ethyl acetate (60 cc.), gives 1-(4-7'-chloro-4'-quinolylamino-1-pentyl)-4-(2-pyrimidyl)piperazine (7.65 g.), M.P. 143–144° C.

*Example XXVII*

The procedure of Example XXIV is followed but starting with 4-(5-1'-piperazinyl - 2 - pentyl)amino-7-chloroquinoline (10 g.), 2-p-chlorophenylamino - 4 - chloro-6-methylpyrimidine (15.3 g.) [prepared according to F. Curd and F. Rose, J. Chem. Soc., p. 349 (1946)] and phenol (17 g.), chromatographing the crude product in solution in a mixture of benzene (10 cc.) and methylene chloride (40 cc.) and eluting successively with a mixture of benzene and methylene chloride (1:3; 500 cc.), methylene chloride (4 litres) and finally methylene chloride containing 1% ethanol (750 cc.). After evaporation of the solvents, an oil (10.27 g.) is obtained which is dissolved in a solution of pure methane sulphonic acid (12.4 g.) in water (500 cc.). This solution is stirred with decolourising charcoal (0.5 g.) and, after filtering, is made alkaline, in an ice bath with stirring, with 10 N sodium hydroxide solution (20 cc.) to pH 13. A white product is obtained which is filtered off, washed with water and dried at 50° C., giving 1-(4-7'-chloro-4'-quinolylamino-1-pentyl)-4-(2-p-chlorophenylamino-4-methyl-6-pyrimidyl)-piperazine (8.07 g.), M.P. 106–110° C.

*Example XXVIII*

Proceeding as in Example VIII but starting with 4-(5-1'-piperazinyl - 2 - pentyl)amino-7-chloroquinoline (10 g.), 2-amino-4-chloropyrimidine (7.8 g.) and phenol (17 g.), chromatographing a solution of the crude product in a benzene-methylene chloride mixture (1:5; 60 cc.) and eluting successively with methylene chloride containing 1% ethanol (1250 cc.) and methylene chloride containing 2% ethanol (1250 cc.), 1-(4-7'-chloro-4-quinolyl-amino-1-pentyl)-4-(2-amino-4-pyrimidyl)piperazine (2.73 g.), M.P. 191–193° C., is obtained after recrystallisation from ethyl acetate.

*Example XXIX*

A mixture comprising 4-(5-1'-piperazinyl-2-pentyl) amino-7-chloroquinoline (10 g.), 2-methoxy-6,9-dichloroacridine (8.35 g.) and phenol (30 g.) is heated for 30 minutes at 135° C. and then for 30 minutes at 125° C. After cooling to 80° C., the reaction mixture is poured, with stirring, into a mixture of chloroform (100 cc.), water (100 cc.) and 10 N sodium hydroxide solution (30 cc.), stirred for one hour, decanted and the aqueous phase extracted with chloroform (2 x 100 cc.). The chloroform extracts are combined and poured into a solution of methanesulphonic acid (15 g.) in water (1 litre). After stirring for 15 minutes, decanting and extracting the chloroform layer with water (3 x 100 cc.), the combined aqueous layer and aqueous extracts are stirred for 15 minutes with decolourising charcoal (0.5 g.) and filtered. The solution is made alkaline with 10 N sodium hydroxide solution, extracted with methylene chloride (3 x 200 cc.) and the organic phase dried over sodium sulphate, filtered and dried on a water-bath giving an oil (14 g.). This oil is taken up in a mixture of benzene and methylene chloride (1:1; 100 cc.) and the solution chromatographed through an alumina column (150 g.). After elution with methylene chloride (1100 cc.) and methylene chloride containing 1% ethanol (100 cc.) and evaporation of the solvents, a crystalline, fluorescent product (5 g.) is obtained. This product is recrystallised from ethanol (250 cc.) giving, after filtration, separation and drying, 1 - (4-7'-chloro-4'-quinolylamino-1-pentyl)-4-(2-methoxy-6 - chloro - 9 - acridyl)piperazine (4.35 g.), M.P. 136–138° C.

*Example XXX*

A mixture of 4-chloro-6-acetamidoquinaldine (14 g.), 4-(5-1'-piperazinyl-2-pentyl)amino-7-chloroquinoline (20 g.) and phenol (15 g.) is heated for 24 hours at 120–125° C. and, after cooling, the reaction mass is dissolved in methanol (250 cc.) to which is then added water (500 cc.) and sodium hydroxide solution (d.=1.33; 50 cc.). The gummy precipitate which forms is extracted with methylene chloride (total 800 cc.). The solvent is removed by distillation and the residual oil dried at 80° C./20 mm. Hg. The crude product obtained is dissolved in a methylene chloride-methanol mixture (97:3; 720 cc.) and chromatographed through a column of alumina (700 g.). After elution with the methylene chloride-methanol mixture (97:3; 2 litres), the combined eluates are evaporated to dryness and the oily residue dissolved in boiling methyl ethyl ketone (220 cc.), from which the base crystallises on cooling, giving 1-(4-7'-chloro-4'-quinolylamino-1-pentyl) - 4 - (2-methyl-6-acetamido-4-quinolyl)piperazine (23 g.), M.P. 246° C.

*Example XXXI*

A mixture of phenol (56.5 g.), 2-bromopyridine (28.6 g.) and 4-(3-1'-piperazinyl - 2 - propyl)amino-7-chloroquinoline (55.6 g.) is heated for 8 hours at 155° C. The mass obtained is poured into a solution of sodium hydroxide (60 g.) in water (400 cc.) and then extracted with chloroform (600 cc.). The chloroform solution is treated with a solution of methanesulphonic acid (74 g.) in distilled water (600 cc.). After decanting, the aqueous solution obtained is treated with sodium hydroxide (30 g.) dissolved in distilled water (70 cc.). After extracting with methylene chloride (450 cc.), the organic solution obtained is dried over sodium sulphate (20 g.) and then chromatographed through a column of alumina (600 g.) 4 cm. in diameter and 60 cm. high. After elution with methylene chloride (2200 cc.), the solvent is evaporated and the solid obtained crystallised firstly from acetonitrile (180 cc.) and then from 35% methanol (1400 cc.). The product is dried in vacuo (0.1 mm. Hg) for 24 hours at laboratory temperature and 18 hours at 75° C., giving 1-(2-7'-chloro - 4 - quinolylamino-1-propyl)-4-(2-pyridyl) piperazine (32.3 g.), M.P. 162–163° C.

*Example XXXII*

Phenol (106 g.), 2-phenyl-4-chloropyridine (34.1 g.) and 4-(3-1'-piperazinyl-2-propyl)amino-7-chloroquinoline (54.7 g.) are heated for 7 hours at 155° C. The mass obtained is poured into a solution of sodium hydroxide (90 g.) in distilled water (500 cc.) and extracted with chloroform (550 cc.). The chloroform solution is treated with methanesulphonic acid (76 g.) in distilled water (600 cc.) and the aqueous solution obtained is treated with sodium hydroxide (30 g.) dissolved in distilled water (70 cc.). After extraction with methylene chloride (500 cc.), a white solid precipitates from the solution and is recrystallised firstly from acetonitrile (250 cc.) and secondly from a mixture of methanol (130 cc.) and distilled water (27 cc.). The product is dried in vacuo (0.1 mm. Hg) for 24 hours at laboratory temperature and 24 hours at 65° C., giving 1-(2-7'-chloro-4'-quinolylamino - 1 - propyl)-4-(2-phenyl-4-pyridyl)piperazine (20 g.), M.P. 178–179° C.

Example XXXIII

A mixture of 1-(4-7'-chloro-4-quinolylamino-1-pentyl)-4-(2-methyl-6-acetamido-4-quinolyl)piperazine (prepared as in Example XXX) (2.65 g.), potassium hydroxide (2.5 g.), water (2 cc.) and ethanol (35 cc.) is heated under reflux for 24 hours. The solvent is then removed in vacuo and the residue taken up in water (250 cc.). Filtration and washing with water gives 1-(4-7'-chloro-4'-quinolylamino - 1 - pentyl)-4-(2-methyl-6-amino-4-quinolyl)piperazine (2.4 g.).

Example XXXIV

Embonic acid (117.5 g.) is dissolved in a solution of sodium hydroxide solution (d.=1.33; 60.6 cc.) in distilled water (1 litre), and 1-(4-7'-chloro-4'-quinolylamino-1-pentyl)-4-(7-chloro-4-quinolyl)piperazine (100 g.) is dissolved in a solution of pure methanesulphonic acid (58.2 g.) in distilled water (1 litre). The sodium embonate solution is then poured in one portion, with stirring, into the solution of 1-(4-7'-chloro-4'-quinolylamino-1-pentyl)-4-(7-chloro-4-quinolyl)piperazine methanesulphonate. A precipitate is immediately obtained. The reaction mixture is stirred for 2 hours and the precipitate separated, washed with distilled water (3 litres) and dried under reduced pressure (20 mm. Hg) for 60 hours at 55° C., giving 1-(4-7'-chloro-4'-quinolylamino-1-pentyl)-4-(7-chloro-4-quinolyl)piperazine embonate (205 g.), M.P. about 260° C.

Example XXXV

A mixture of 1 - (4-7'-chloro-4'-quinolylamino-1-pentyl)hexahydro-1,4-diazepine (81 g.), 4,7-dichloroquinoline (46 g.) and phenol (50 g.) is heated for 30 minutes at 160° C. After cooling, the reaction mass is poured into a solution of sodium hydroxide (48 g.) in distilled water (1000 cc.) and the base which precipitates extracted with chloroform (1500 cc.). The chloroform extract is treated with a solution of methanesulphonic acid (70 g.) in distilled water (1000 cc.). After decanting, the aqueous layer is made alkaline with sodium hydroxide solution (d.=1.33; 80 cc.) and the precipitated base extracted with chloroform (1000 cc.). This chloroform solution is dried over sodium sulphate, filtered and chromatographed through an alumina column (1000 g.) 5 cm. in diamether and 70 cm. high. After elution with chloroform (1500 cc.), the solvent is evaporated on a water-bath and the oily residue (80 g.) dissolved in boiling methanol (1000 cc.). A solution of anhydrous oxalic acid (42 g.) in methanol (500 cc.) is added and the crystalline precipitate obtained separated, recrystallised from water (700 cc.), separated and then dried at 70° C. in vacuo (0.05 mm. Hg) for 20 hours, giving 1-(4-7'-chloro-4' - quinolylamino - 1 - pentyl) - 4-(7-chloro-4-quinolyl)-hexahydro-1,4-diazepine oxalate (41 g.), M.P. about 185° C.

The 1 - (4 - 7' - chloro-4'-quinolylamino-1-pentyl)hexahydro-1,4-diazepine starting material was obtained by condensing 4 - (5 - chloro-2-pentyl)amino-7-chloroquinoline (65 g.) with hexahydro-1,4-diazepine (112 g.).

Example XXXVI

A mixture of 1-(3-amino-1-propyl)-4-(7-chloro-4-quinolyl)piperazine (58.1 g.), 4,7-dichloroquinoline (37.8 g.) and phenol (36 g.) is heated for 4 hours at 180° C. After being allowed to cool to 125° C., the reaction mass is poured into a solution of sodium hydroxide (25 g.) in distilled water (200 cc.) and the base immediately extracted with chloroform (1000 cc.). The solution is dried over anhydrous sodium sulphate and chromatographed through alumina (600 g.) in a column 4.5 cm. in diameter and 40 cm. high. On elution with chloroform (2 litres), the eluates are separated into fractions (500 cc. each). By concentration to dryness of the combined 3rd and 4th eluates and two successive recrystallisations of the residue from acetonitrile (80 cc. and 60 cc. respectively), 1-(3-7'-chloro-4'-quinolylamino-1 - propyl) - 4-(7-chloro-4-quinolyl)piperazine (7.8 g.), M.P. 176–177° C., is obtained, the melting point not being depressed when mixed with a sample of the product of Example IV.

The 1 - (3 - amino - 1-propyl)-4-(7-chloro-4-quinolyl)-piperazine starting material was obtained by the dephthalimidation of 1-(3-phthalimido-1-propyl)-4-(7-chloro-4-quinolyl)piperazine, itself obtained by the condensation of 4,7-dichloroquinoline with N-3-phthalimido-1-propylpiperazine.

The present invention further includes within its scope pharmaceutical compositions which comprise one or more compounds of general Formula I or non-toxic acid addition salts thereof together with a pharmaceutical carrier or coating. In clinical practice the compounds of the present invention will normally be administered orally, in consequence of which the preferred compositions are those of the kind suitable for oral administration.

Solid compositions for oral administration include compressed tablets (including enteric coated tablets), pills, dispersible powders, and granules. In such solid compositions one or more of the active compounds is, or are, admixed with at least one inert diluent such as calcium carbonate, potato starch, alginic acid, sucrose or lactose. The compositions may also comprise, as is normal practice, additional substances other than inert diluents, e.g. lubricating agents, such as magnesium stearate. Liquid compositions for oral administration include pharmaceutically acceptable emulsions, solutions, suspensions, syrups, and elixirs containing inert diluents commonly used in the art, such as water and liquid paraffin. Besides inert diluents such compositions may also comprise adjuvants, such as wetting and suspending agents, and sweetening, flavouring, perfuming and preserving agents. The compositions according to the invention, for oral administration, also includes capsules of absorbable material such as gelatin or cellulose acetophthalate containing one or more of the active substances with or without the addition of diluents or excipients.

The percentage of active ingredient in the compositions of the invention may be varied, it being necessary that it should constitute a proportion such that a suitable dosage for the therapeutic effect desired shall be obtained. Obviously several unit dosage forms may be administered at about the same time. In general, the preparations should normally be such as to give conveniently between 0.5 and 15 mg. per kilogram of weight of the animal to be treated. In human therapy, for use as antimalarials, anthelmintics or amoebicides, the compositions should generally be administered so as to give 0.1 to 1.5 g. of active substance (calculated as base) per day.

The following examples illustrate pharmaceutical compositions according to the invention.

Example XXXVII

Tablets are prepared having the following composition:

| | Mg. |
|---|---|
| Active product | 200 |
| Starch | 155 |
| Silica gel | 30 |
| Magnesium stearate | 15 |

The active product was, in a first series of tablets, 1-(4-7' - chloro - 4' - quinolylamino - 1-pentyl)-4-(7-chloro-4-quinolyl)piperazine, in a second series, 1-(3-7'-chloro-4'-quinolylamino - 1 - propyl)-4-(7-chloro-4-quinolyl)piperazine and, in a third series, 1-(2-7'-chloro-4'-quinolylamino-1-propyl)-4-(7-chloro-4-quinolyl)piperazine.

Example XXXVIII

Capsules of cellulose acetophthalate each containing 200 mg. of 1-(4-7'-chloro-4'-quinolylamino-1-pentyl)-4-(7-chloro-4-quinolyl)piperazine are prepared.

Example XXXIX

Enteric-coated tablets:

Tablets of lenticular form having the general composition of the tablets of Example XXXVII are prepared, which are then covered with a varnish by spraying with the following mixture:

| | | |
|---|---|---|
| Cellulose acetophthalate | g | 5 |
| Palmitic acid | g | 1 |
| Ethanol 95° GL | cc | 50 |
| Ethyl acetate, qs. | cc | 100 |

As active products, D(—) 1-(2-7'-chloro-4'-quinolylamino-1-propyl)-4-(7-chloro-4-quinolyl)piperazine was used in a first series, and 1-(4-7'-chloro-4'-quinolylamino-1-pentyl)-4-(6-chloro-4-quinolyl)piperazine in a second series.

Example XL

Enteric-coated tablets:

Enteric tablets are prepared by proceeding as in Example XXXIX but using the following coating solution:

| | | |
|---|---|---|
| Zein | g | 10 |
| Acetic anhydride | cc | 2 |
| Butyl acetoricinoleate | cc | 4 |
| Ethanol 95° GL, qs. | cc | 100 | and using 1-(4-7'-chloro-4'-quinolylamino-1-pentyl)-4-(7-methoxy-4-quinolyl)piperazine as active compound.

We claim:

1. A 4-aminoquinoline derivative selected from the class consisting of compounds of the formula:

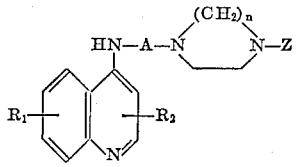

wherein A represents a saturated aliphatic hydrocarbon group containing 2 to 6 carbon atoms, $R_1$ represents a member of the class consisting of hydrogen and halogen atoms and amino, acetamido, dimethylsulphamoyl, trifluoroethyl and alkoxy containing up to 3 carbon atom groups in the 5-, 6-, 7-, or 8-position of the quinoline ring, $R_2$ represents a member of the class consisting of hydrogen atoms and alkyl groups containing up to 3 carbon atoms in the 2- or 3-position of the quinoline ring, Z represents a member selected from the class consisting of a 2-pyridyl, a 4-pyridyl, a 2-phenyl-4-pyridyl, a 2-pyrimidyl, a 2-amino-4-pyrimidyl, a 2-amino-4-ethyl-5-(p-chlorophenyl) - 6 - pyrimidyl, a 2-(p-chlorophenylamino) - 4 - methyl-6-pyrimidyl, a 2-methoxy-6-chloro-9-acridyl, and the groups of the formula:

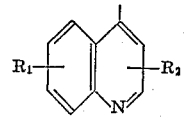

where $R_1$ and $R_2$ are as hereinbefore defined, $n$ represents an integer selected from 2 and 3 and non-toxic acid addition salts of any of the said compounds.

2. 1-(4 - 7' - chloro-4'-quinolylamino-1-pentyl)-4-(7-chloro-4-quinolyl)piperazine.

3. 1 - (4 - 7' - chloro-4'-quinolylamino-1-pentyl)-4-(6-chloro-4-quinolyl)piperazine.

4. 1 - (4 - 7' - chloro-4'-quinolylamino-1-pentyl)-4-(7-methoxy-4-quinolyl)piperazine.

5. 1 - (2 - 7' - chloro-4'-quinolylamino-1-propyl)-4-(7-chloro-4-quinolyl)piperazine.

6. 1 - (3 - 7' - chloro-4'-quinolylamino-1-propyl)-4-(7-chloro-4-quinolyl)piperazine.

7. 1 - (4 - 6' - chloro-4'-quinolylamino-1-pentyl)-4-(7-chloro-4-quinolyl)piperazine.

8. 1 - (5 - 7' - chloro-4'-quinolylamino-1-pentyl)-4-(7-chloro-4-quinolyl)piperazine.

9. 1 - (4 - 7' - chloro-4'-quinolylamino-1-butyl)-4-(7-chloro-4-quinolyl)piperazine.

10. 1 - (2 - 7' - chloro-4'-quinolylamino-1-butyl)-4-(7-chloro-4-quinolyl)piperazine.

References Cited in the file of this patent

UNITED STATES PATENTS

| | | |
|---|---|---|
| 2,534,774 | Jacob et al. | Dec. 19, 1950 |
| 2,627,491 | Szabo et al. | Feb. 3, 1953 |
| 2,645,594 | Tabern | July 14, 1953 |
| 2,786,845 | Mauss | Mar. 26, 1957 |
| 2,927,924 | Mills | Mar. 8, 1960 |
| 2,937,177 | Bach et al. | May 17, 1960 |

OTHER REFERENCES

Noller: Chemistry of Organic Compounds, 2nd Edition, page 237, W. B. Saunders Co., Philadelphia (1957). QD 253. N65.